Nov. 8, 1960  R. SHEMANSKE  2,959,720
ELECTRIC MOTOR CONTROL CIRCUIT
Filed Oct. 31, 1957  3 Sheets-Sheet 1
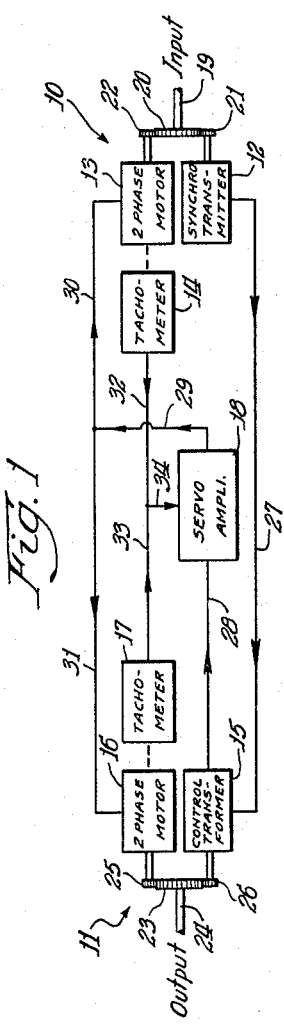
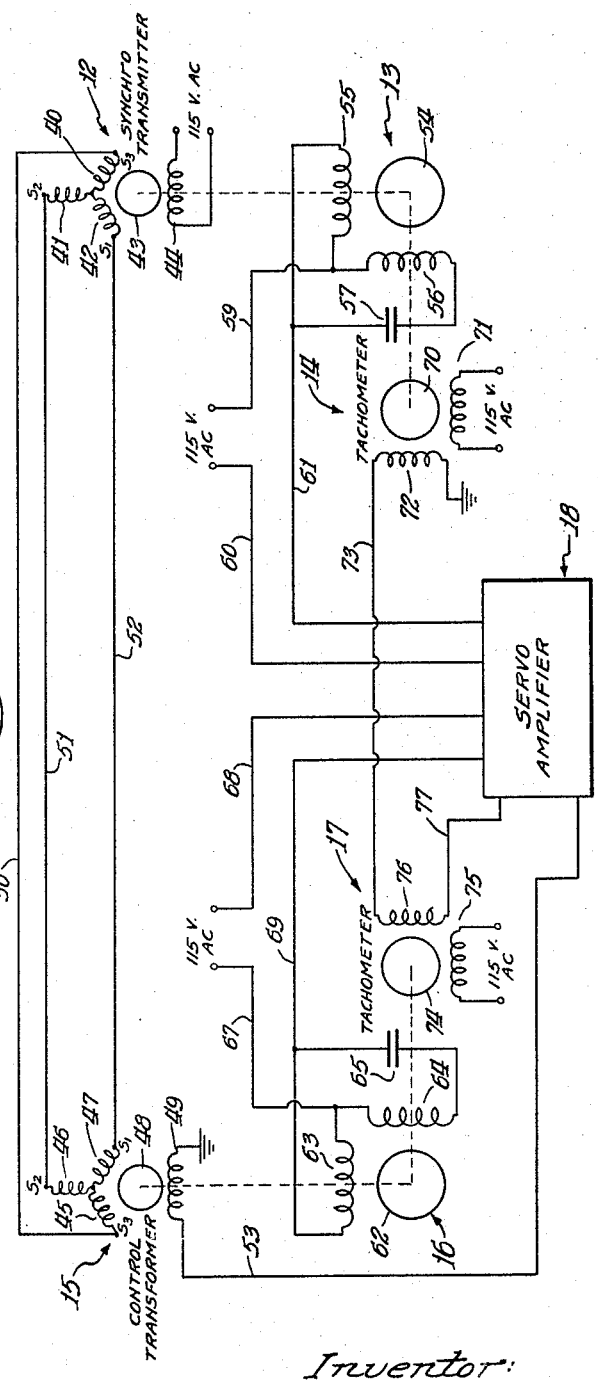
Inventor:
Richard Shemanske
By: Ray E. Snyder  Atty.

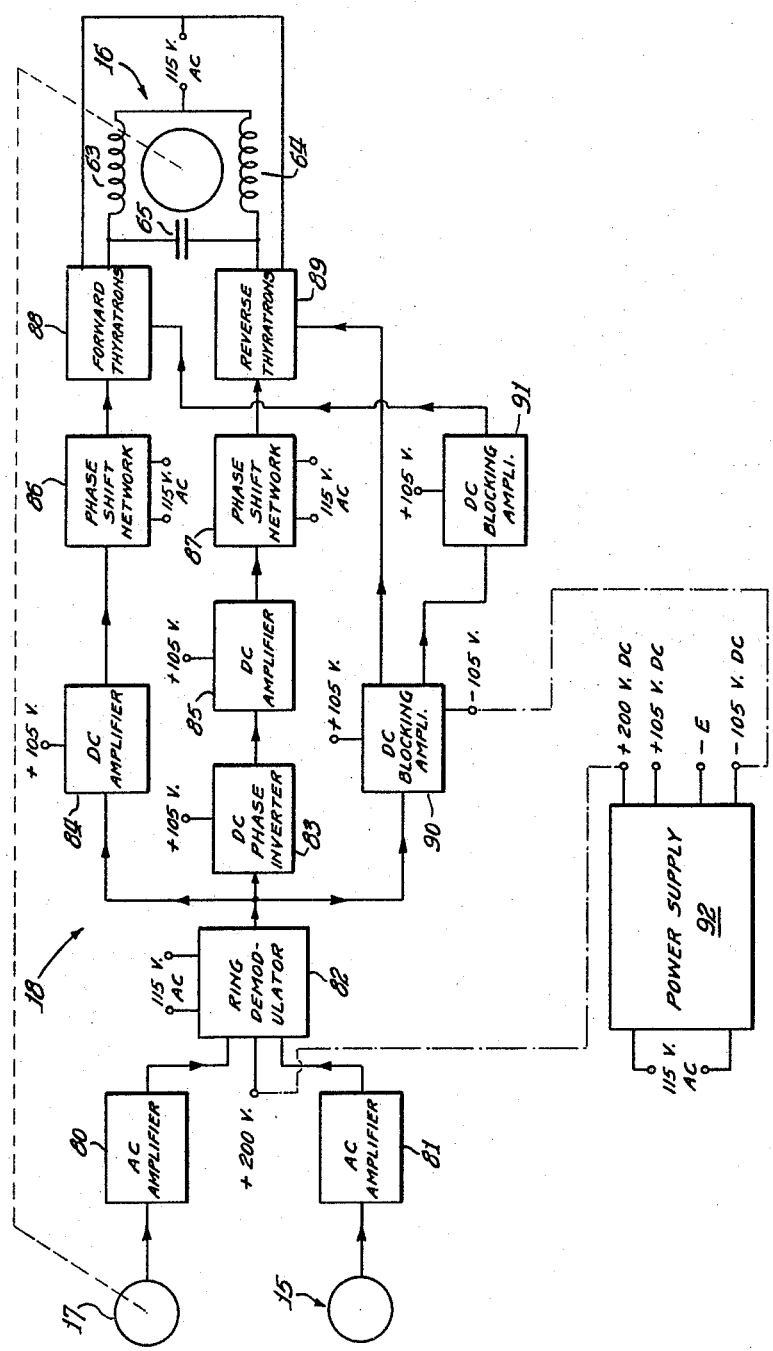

Nov. 8, 1960  R. SHEMANSKE  2,959,720
ELECTRIC MOTOR CONTROL CIRCUIT
Filed Oct. 31, 1957  3 Sheets-Sheet 3

Inventor:
Richard Shemanske
By: Ray E. Snyder
Atty.

United States Patent Office 2,959,720
Patented Nov. 8, 1960

2,959,720

ELECTRIC MOTOR CONTROL CIRCUIT

Richard Shemanske, Mount Prospect, Ill., assignor to Borg-Warner Corporation, a corporation of Illinois Filed Oct. 31, 1957, Ser. No. 693,579

3 Claims. (Cl. 318—207)

This invention relates to electrical servomechanisms and more particularly to a thyratron control circuit for such a servomechanism.

It is known to employ a two phase induction motor and thyratrons in an electrical servomechanism. The two phase induction motor commonly has two windings one of which is connected to an A.C. power line and is called a reference winding, the other of which, commonly called the control winding, is connected to an A.C. servo amplifier which controls the speed and direction of rotation of the two phase motor. The reference winding commonly also is connected to the A.C. power line through a phase shift capacitor or a 90° phase shift network.

The thyratron tubes employed in an A.C. servo amplifier for an electrical servomechanism commonly are energized by applying an A.C. voltage to the plates or anodes of such tubes. An A.C. voltage applied to the plate of a thyratron causes it to fire or conduct when the plate voltage reaches the ionization potential of the gas within the tube, unless a negative voltage is applied to the grid of the tube so as to prevent it from firing. Once the tube begins to conduct, however, the grid loses control completely.

The time at which the thyratron fires commonly is controlled by applying an A.C. voltage to the control grid of the tube which voltage is 180° out of phase with the voltage applied to the plate. The tube is made to fire by shifting the phase of the control grid voltage with respect to the phase of the plate voltage.

The conventional type of A.C. servo amplifier has the disadvantage of requiring that an A.C. voltage be applied at all times to one winding of the two phase motor. This results in a waste of power and causes heating of the motor when no signal is applied to the other winding of the motor.

It has heretofore been proposed to utilize a thyratron control circuit for a two phase motor in which neither winding of the motor is energized when no signal is applied. The previous attempts to employ such a circuit have failed because of the fact that the phase shift capacitor for the two phase motor caused misfiring of some of the thyratrons in the control circuit. The phase shift capacitor caused this misfiring by shifting the plate or anode voltage of the thyratrons with respect to the voltage applied to the grids. This misfiring resulted in a loss of torque of the two phase motor.

It is an object of the present invention to provide an improved thyratron control circuit for a two phase motor wherein no current flows through the windings of the motor when no signal is applied to the thyratrons.

It is also an object to provide an improved thyratron control circuit for a two phase motor having a phase shift capacitor wherein the control circuit renders ineffective the phase shifting effect of the phase shift capacitor as applied to some of the thyratrons.

It is another object to provide an improved thyratron control circuit for a two phase motor having thyratrons for driving a motor in the forward direction and additional thyratrons for driving the motor in the reverse direction and a D.C. blocking amplifier connected with said thyratrons for preventing misfiring thereof.

It is still another object to provide an improved control circuit for a two phase motor having forward driving thyratrons and reverse driving thyratrons and D.C. blocking amplifiers for each set of thyratrons for preventing the misfiring of one or the other set of thyratrons.

It is another object to provide an improved control circuit for a two phase motor having two windings and a phase shift capacitor connected therebetween, said control circuit comprising two sets of thyratrons connected in inverse parallel, one set for driving the motor in the forward direction and the other set for driving the motor in the reverse direction, and a D.C. blocking amplifier for each set of thyratrons for supplying a negative D.C. voltage to the grids of the nonconducting set of thyratrons so as to prevent misfiring thereof due to anode phase shift caused by the phase shift capacitor.

The invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

Figure 1 is a block diagram of a servomechanism employed in an electrocmechanical master-slave manipulator and including a servo amplifier;

Figure 2 is a partial schematic diagram of the servomechanism shown in Figure 1;

Figure 3 is a block diagram of the servo amplifier of Figure 1; and

Like characters of reference designate like parts in the several views.

Figure 4:
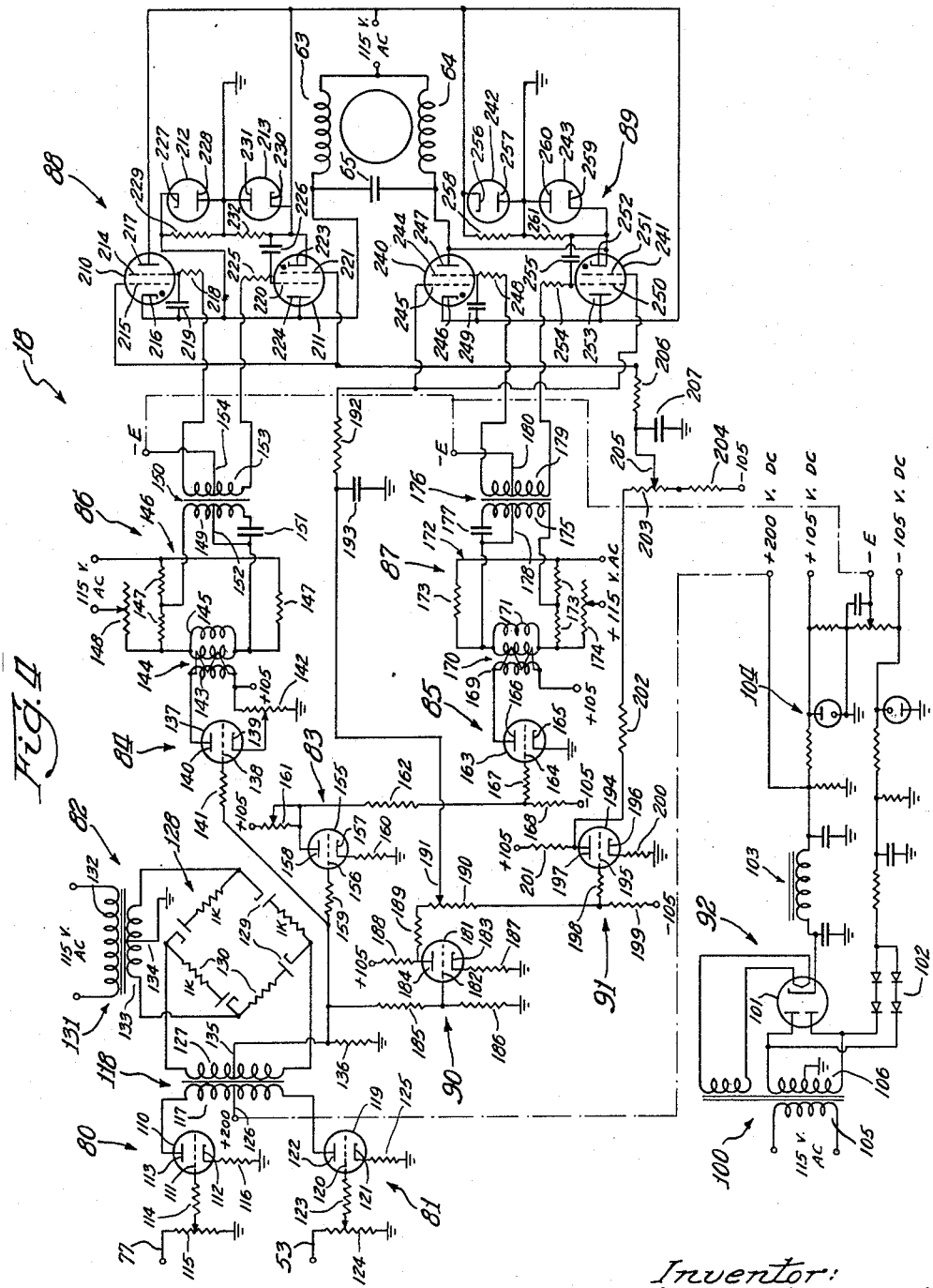
Figure 4 is a schematic illustration of the diagram of Figure 3.

Referring now to Figure 1, the servomechanism there illustrated comprises a master assembly 10 and a slave assembly 11. The master assembly comprises a synchro transmitter 12, a two phase motor 13, and a tachometer 14 mounted on the motor 13. The slave assembly 11 comprises a control transformer 15, a two phase motor 16, and a tachometer 17 mounted on the motor 16. The components of the master assembly 10 and of the slave assembly 11 are interconnected through a servo amplifier 18.

The master assembly 10 is driven by means of an input shaft 19 to which is attached a gear 20. The gear 20 is in mesh with a gear 21 rotatably mounted on the synchro transmitter 12, and the gear 20 is also in mesh with a gear 22 rotatably mounted on a two phase motor 13.

The two phase motor 16 of the slave assembly 11 drives an output gear 23 and an output shaft 24 by means of a gear 25 rotatably mounted on the motor 16 and in mesh with the gear 23. The gear 23 is also in mesh with a gear 26 rotatably mounted on the control transformer 15. The synchro transmitter 12 is connected to the control transformer 15 by means of a cable 27 and the control transformer 15 is also connected to the servo amplifier 18 by a cable 28. The servo amplifier 18 is connected to the motors 13 and 16 by means of a cable 29 and branch cables 30 and 31. The tachometers 14 and 17 are connected to the amplifier 18 by means of cables 32 and 33 and a common cable 34.

Referring now to Fig. 2, which is a more detailed schematic diagram of the servomechanism illustrated in Fig. 1, the synchro transmitter 12 comprises stator windings 40, 41 and 42, a rotor 43, and a rotor winding 44. One end of each of the windings 40, 41 and 42 is connected to a common junction, and the rotor winding 44 is connected to the A.C. line.

The control transformer 15 comprises stator windings 45, 46, and 47, a rotor 48, and a rotor winding 49. The stator windings 45, 46, and 47 each are connected at one end to a common junction. The stator windings 40, 41, and 42 of the synchro transmitter 12 are respectively connected with the stator windings 45, 46, and 47 of the control transformer 15 by means of conductors 50, 51, and 52 respectively. One end of the rotor winding 49 is connected to the amplifier 18 by means of a conductor 53, the other end of the rotor winding 49 is connected to ground.

The two phase motor 13 comprises a squirrel cage rotor 54, stator windings 55 and 56, and a phase shift capacitor 57. Each of the windings 55 and 56 is connected at one end to one side of the A.C. line by means of a conductor 59. The other side of the A.C. line is connected to the amplifier 18 by means of a conductor 60. The capacitor 57 is connected at one side to the winding 56 and is connected at its other side to an end of the winding 55 and to a conductor 61 which leads to the amplifier 18.

The two phase motor 16 comprises a squirrel cage rotor 62, windings 63 and 64, and a phase shift capacitor 65. One end of each of the windings 63 and 64 is connected to one side of the A.C. line by means of a conductor 67. The other side of the A.C. line is connected to the amplifier 18 by means of a conductor 68. The capacitor 65 is connected across the ends of the windings 63 and 64 and at one side to a conductor 69 which leads to the amplifier 18.

The tachometer 14 comprises a rotor 70 and windings 71 and 72. The rotor 70 is coaxial and integral with the rotor 54 of the two phase motor 13. The winding 71 is connected across the A.C. line. One end of the winding 72 is connected to the tachometer 17 by means of a conductor 73 and the other end of the winding 72 is connected to ground.

The tachometer 17 comprises a rotor 74 and windings 75 and 76. The rotor 74 is coaxial and integral with the rotor 62 of the two phase motor 16. The winding 75 is connected across the A.C. line. One end of the winding 76 is connected to the conductor 73 and the other end of the winding 76 is connected to the amplifier 18 by means of a conductor 77.

In operation, a mechanical input is applied to the master assembly 10 by rotating the input shaft 19 and the gear 20. The gear 20 drives the gear 21 which rotates the rotor 43 and rotor winding 44 of the synchro transmitter 12. The A.C. line voltage applied to the rotor winding 44 induces voltages in the stator windings 40, 41, and 42 that are related to the angular position of the rotor 43. The voltages induced in the windings 40, 41, and 42 cause currents to flow through the conductors 50, 51, and 52, respectively, to the windings 45, 46, and 47 of the control transformer 15. The currents flowing through the windings 45, 46 and 47 establish a resultant magnetic field within the control transformer 15 having a direction corresponding to the angular position of the rotor 43 of the synchro transmitter 12. The rotor 48 initially has an angular position different from that of the rotor 43 and a voltage is induced in the rotor winding 49 which is called an error signal. This error signal is transmitted through the conductor 53 to the servo amplifier 18. The servo amplifier 18 amplifies the error signal and transmits this amplified signal to the windings 63 and 64 of the motor 16 and also to the windings 55 and 56 of the motor 13. The rotor 62 of the two phase motor 16 is driven and drives the gear 25, which in turn drives the gear 23 and the output shaft 24 through the same angular displacement as applied to the input shaft 19. The gear 26 on the control transformer 15 is driven by the gear 23, and the rotor 48 and windings 49 are rotated to an angular position corresponding to the position of the rotor 43 of the synchro transmitter 12.

The tachometers 14 and 17 are driven by the motors 13 and 16 respectively. Line voltage is applied to the winding 71 of the tachometer 14 and to the winding 75 of the tachometer 17. The rotors 70 and 74, when rotated, cause a voltage to be generated in the windings 72 and 76, respectively. This voltage or signal constitutes a derivative or velocity signal which is fed back to the servo amplifier 18 through the conductor 77. This derivative signal is combined in the servo amplifier 18 with the signal from the control transformer 15 and functions to prevent hunting of the two phase motor 16 when it has turned to the angular position dictated initially by the synchro transmitter 12.

The two phase motor 13 on the master assembly 10 is driven by the same signal from the servo amplifier 18 that drives the motor 16 on the slave assembly 11. The purpose of the two phase motor 13 is to exert a torque on the input shaft 19 corresponding to the torque exerted by the output shaft 24. The two phase motor 13 thus provides a force reflecting means to the master assembly 10 so that an operator of the master assembly 10 can sense the force exerted by the slave assembly 11.

The servo amplifier 18 shown in Figures 1 and 2 is illustrated by means of a block diagram of its components in Figure 3. The servo amplifier 18 is seen to comprise A.C. amplifiers 80 and 81, a ring demodulator 82, a D.C. phase inverter 83, D.C. amplifiers 84 and 85, phase shift networks 86 and 87, forward thyratrons 88, reverse thyratrons 89, D.C. blocking amplifiers 90 and 91, and a power supply 92.

The power supply 92 provides D.C. voltages to the various components of the servo amplifier 18 as will be subsequently described.

Two input signals are supplied to the servo amplifier 18, one from the tachometers 17 and 14 which is applied to the input of the A.C. amplifier 80, and the other from the control transformer 15 which is applied to the input of the A.C. amplifier 81. The outputs from the A.C. amplifiers 80 and 81 are applied to input terminals of the ring demodulator 82. The output from the ring demodulator 82 is applied to the D.C. amplifier 84, the D.C. phase inverter 83, and the D.C. blocking amplifier 90.

The output of the D.C. amplifier 84 is applied to the input of the phase shift network 86, and the output from the phase shift network 86 is applied to one input of the forward thyratrons 88. The output of the D.C. phase inverter 83 is applied to the input of the D.C. amplifier 85; the output from the D.C. amplifier 85 is applied to the input of the phase shift network 87; and the output from the phase shift network 87 is applied to one input of the reverse thyratrons 89.

One output of the D.C. blocking amplifier 90 is applied to a second input of the reverse thyratrons 89. A second output of the D.C. blocking amplifier 90 is applied to the input of the D.C. blocking amplifier 91, and the output of the D.C. amplifier 91 is applied to a second input of a forward thyratron 88. The forward and reverse thyratrons 88 and 89 are connected to one side of the A.C. line, to the phase shift capacitor 65, and to the windings 63 and 64 of the two phase motor 16. The windings 63 and 64 also are connected to the other side of the A.C. line.

Referring now to Figure 4, there is illustrated a complete schematic diagram of the components of the servo amplifier 18, illustrated by block diagram in Figure 3.

The power supply 92 for the servo amplifier 18 comprises a power transformer 100 a full wave rectifier tube 101, dry metal rectifiers 102, filter networks 103 and voltage regulator circuits 104. A primary winding 105 of the power transformer 100 is connected to the A.C. line and a secondary winding 106 of the transformer 100 is connected to the plates of the tube 101 and to the rectifiers 102. The output from the rectifier tube 101 and from the dry metal rectifiers 102 is filtered in a conventional fashion by the filter circuits 103 and by the voltage regulator circuits 104. The power supply 92 has four outputs taken from the filter circuits 103 and from the regulator circuits 104 for delivering plus 200 v. D.C. unregulated, regulated plus 105 v. D.C. and minus 105 v. D.C., and a variable negative D.C. voltage —E.

The A.C. amplifier 80 comprises a vacuum tube 110 having a grid 111, a cathode 112 and a plate 113. The grid 111 is connected through a resistor 114, to a slider arm of a potentiometer 115. One end of the potentiometer 115 is connected to the input conductor 77 from the tachometer 17 and the other end is connected to ground. The cathode 112 is connected through a cathode bias resistor 116 to ground. The plate 113 is connected to one end of a primary winding 117 of a transformer 118.

The A.C. amplifier 81 comprises a vacuum tube 119 having a grid 120, cathode 121, and a plate 122. The grid 120 is connected through a resistor 123 to a slider arm of a potentiometer 124. One end of the potentiometer 124 is connected to the conductor 53 leading from the control transformer 15 and the other end is connected to ground. The cathode 121 is connected through a bias resistor 125 to ground. The plate 122 of the tube 119 is connected to the other end of the primary winding 117 of transformer 118. A center tap 126 of the primary winding 117 is connected to the plus 200 v. D.C. output of the power supply 92.

A secondary winding 127 of the transformer 118 is connected to one diagonal of a bridge network 128 comprising part of the ring demodulator 82. The bridge network 128 has four arms with a crystal diode rectifier 129 in series with a 1k resistor 130 in each arm thereof. The ring demodulator 82 also comprises a transformer 131 having a primary winding 132 and a secondary winding 133. The primary winding 132 is connected to the A.C. line and the secondary winding 133 is connected across the other diagonal of the bridge network 128. A center tap 134 of the secondary winding 133 is connected to ground. The output from the ring demodulator 82 is taken from a center tap 135 of the secondary winding 127 of the transformer 118. The center tap 135 of the transformer is connected to one end of a resistor 136, the other end of which is connected to ground.

The D.C. amplifier 84 comprises a vacuum tube 137 having a grid 138, a cathode 139, and a plate 140. The grid 138 is connected through a resistor 141 to the center tap 135. The cathode 139 is connected to a slider arm of a potentiometer 142. One end of the potentiometer 142 is connected to the plus 105 v. D.C. supply and the other end is connected to ground. The plate 140 is connected to one end of a D.C. winding 143 of a saturable reactor 144. The other end of the D.C. winding 143 is connected to the plus 105 v. D.C. supply. The D.C. winding 143 of the saturable reactor 144 is linked magnetically with A.C. windings 145 which comprise a part of the phase shift network 86.

The phase shift network 86 in general comprises an impedance bridge network 146 having the A.C. windings 145 in one arm thereof and equal resistors 147 in the other three arms thereof. The A.C. line is connected to one diagonal of the bridge network 146 through a rheostat 148 and an output is taken across the other diagonal. The output leads are connected to a primary winding 149 of a transformer 150. One side of a capacitor 151 is connected to one end of the primary winding 149 and is connected at its other side to a center tap 152 of the winding 149. The transformer 150 has a secondary winding 153 which constitutes an input to the forward thyratrons 88. The winding 153 has a center tap 154 which is connected to the —E output on the power supply 92.

The D.C. phase inverter 83 comprises a vacuum tube 155 having a grid 156, a cathode 157, and a plate 158. The grid 156 is connected through a resistor 159 to the center tap 135 of the transformer 118. The cathode 157 is connected through a bias resistor 160 to ground. The plate 158 is connected to one end of a potentiometer 161, the other end of which is connected to the plus 105 v. D.C. supply. The plate 158 is also connected to the slider arm of the potentiometer 161 and to one end of a resistor 162. The other end of the resistor 162 leads to the D.C. amplifier 85.

The D.C. amplifier 85 comprises a vacuum tube 163 having a grid 164, a cathode 165, and a plate 166. The grid 164 is connected to one end of a resistor 167, the other end of which is connected to the resistor 162. The resistor 167 is also connected through a resistor 168 to the minus 105 v. D.C. supply. The cathode 165 is connected directly to ground. The plate 166 is connected to one end of a D.C. winding 169 of a saturable reactor 170. The other end of the winding 169 is connected to the plus 105 v. D.C. supply. The saturable reactor 170 also has A.C. windings 171 which are magnetically linked with the D.C. winding 169 and which comprises a part of the phase shift network 87.

The phase shift network 87 in general comprises an impedance bridge network 172 having the A.C. windings 171 in one arm thereof and equal resistors 173 in the other arms thereof. The A.C. line is connected to one diagonal of the bridge network 172 through a rheostat 174 and an output signal is taken from across the other diagonal of the bridge network 172. A primary winding 175 of a transformer 176 is connected to the output terminals of the bridge network 172. One side of a capacitor 177 is connected to one end of the winding 175 and the other side of the capacitor 177 is connected to a center tap 178 of the primary winding 175. The transformer 176 has a secondary winding 179 which constitutes an input to the reverse thyratrons 89. A center tap 180 of the secondary winding 179 is connected to the —E D.C. supply.

The D.C. blocking amplifier 90 comprises a vacuum tube 181 having a grid 182, a cathode 183, and a plate 184. The grid 182 is connected through a resistor 185 to the center tap 135 of the transformer 118. The grid 182 is also connected through a resistor 186 to ground. The cathode 183 is connected through a resistor 187 to ground. The plate 184 is connected through a resistor 188 to the plus 105 v. D.C. supply. The plate 184 is also connected through a resistor 189 to one end of a potentiometer 190. The other end of the potentiometer 190 leads to the blocking amplifier 91. A slider arm 191 of the potentiometer 190 is connected through a resistor 192 to the reverse thyratrons 89. A capacitor 193 is connected between the slider arm 191 of the potentiometer 190 and ground.

The blocking amplifier 91 comprises a vacuum tube 194 having a grid 195, a cathode 196, and a plate 197. The grid 195 is connected to one end of a resistor 198, the other end of the resistor 198 is connected to one end of the potentiometer 190 and is also connected through a resistor 199 to the minus 105 D.C. supply. The cathode 196 is connected through a bias resistor 200 to ground. The plate 197 is connected through a resistor 201 to the plus 105 v. D.C. supply. The plate 197 also is connected through a resistor 202 to one end of a potentiometer 203. The other end of the potentiometer 203 is connected through a resistor 204 to the minus 105 v. D.C. supply. A slider arm 205 of the potentiometer 203 is connected through a resistor 206 to the forward thyratrons 88. A capacitor 207 is connected between the slider arm 205 and ground.

The forward thyratrons 88 comprise thyratron tubes 210 and 211 connected in inverse parallel, and vacuum tubes 212 and 213. The tube 210 comprises grids 214 and 215, a cathode 216, and a plate 217. The grid 214 is connected through a resistor 218 to one end of the secondary winding 153 of the transformer 150. The grid 214 also is connected through a capacitor 219 to the cathode 216. The grid 215 is connected to one end of the resistor 192. The cathode 216 is connected to one side of the phase shift capacitor 65 and to one end of the motor winding 63. The plate 217 is connected to one side of the A.C. line.

The thyratron 211 comprises grids 220 and 221, a cathode 223, and a plate 224. The grid 220 is connected through a resistor 225 to the other end of the secondary winding 153 of the transformer 150. The grid 220 also is connected through a capacitor 226 to the cathode 223. The grid 221 is connected to the grid 215 of the tube 210 and to one end of the resistor 206. The cathode 223 is connected to the plate 217 of the tube 210 and to one side of the A.C. line. The plate 224 is connected to the cathode 216 of tube 210, to the phase shift capacitor 65, and to one end of the motor winding 63. The other end of the motor winding 63 is connected to one end of the motor winding 64 and to the other side of the A.C. line.

The vacuum tube 212 comprises a cathode 227 and a plate 228. The cathode 227 is connected to the cathode 216 of the tube 210 and through a resistor 229 to ground. The plate 228 also is connected to ground.

The vacuum tube 213 comprises a cathode 230 and a plate 231. The cathode 230 is connected to one end of a resistor 232 and to the cathode 223 of the tube 211, the other end of the resistor 232 is connected to the plate 231 and to ground.

The reverse thyratrons 89 comprise thyratron tubes 240 and 241 connected in inverse parallel and vacuum tubes 242 and 243. The tube 240 comprises grids 244 and 245, a cathode 246, and a plate 247. The grid 244 is connected through a resistor 248 to one end of the secondary winding 179 of the transformer 176. The grid 244 also is connected through a capacitor 249 to the cathode 246. The grid 245 is connected to one end of the resistor 192. The cathode 246 is connected to one side of the A.C. line. The plate 247 is connected to the phase shift capacitor 65 and to one end of the motor winding 64.

The thyratron tube 241 comprises grids 250 and 251, a cathode 252, and a plate 253. The grid 250 is connected through a resistor 254 to the other end of the secondary winding 179 of the transformer 176. The grid 250 also is connected through a capacitor 255 to the cathode 252. The grid 251 is connected to the grid 245 of tube 240 and to one end of the resistor 206. The cathode 252 is connected to the plate 247 of the tube 240 and to the phase shift capacitor 65 and the motor winding 64. The plate 253 is connected to the cathode 246 of tube 240 and to one side of the A.C. line.

The vacuum tube 242 comprises a cathode 256 and a plate 257. The cathode 256 is connected to one side of the A.C. line and through a resistor 258 to ground. The plate 257 also is connected to ground.

The vacuum tube 243 comprises a cathode 259 and a plate 260. The cathode 259 is connected to the cathode 252 of the tube 241 and through a resistor 261 to ground. The plate 260 also is connected to ground.

In operation, the servo amplifier 18 functions as follows:

An input error signal is taken from the control transformer 15 as previously described and is applied through the potentiometer 124 and the resistor 123 to the grid 120. The potentiometer 124 adjusts the sensitivity of the input signal. The error signal is amplified by the tube 119 and an output signal from the plate 122 is applied to one end of the primary winding 117 of the transformer 118.

An input derivative signal also is taken from the tachometers 17 and 14 connected in series as previously described and is applied through the potentiometer 115 and the resistor 114 to the grid 111 of the vacuum tube 110. The sensitivity of the input derivative signal is adjusted by the potentiometer 115. The signal is amplified by the tube 110 and an output signal from the plate 113 is applied to the other end of the primary winding 117 of the transformer 118.

The combined signals from the tubes 110 and 119 induce a voltage in the secondary winding 127 that varies in magnitude from zero to approximately 50 volts. The phase and magnitude of the voltage developed across the secondary winding 127 is determined by the relative phase and magnitude of the signals coming from the control transformer 15 and from the tachometers 17 and 14. The voltage of the secondary winding 127 is applied across one diagonal of the bridge network 128.

An A.C. voltage of approximately 12.6 volts R.M.S. magnitude is obtained from the secondary winding 133 of the transformer 131 and is applied across the other diagonal of the bridge network 128. The signals from the transformer 118 and from the transformer 131 are combined and rectified by the bridge network 128 and an output is taken from the center tap 135 of the transformer 118. The output signal from the ring demodulator 82 is a full wave rectified D.C. signal that is either positive or negative depending upon the phase and magnitude of the input signals from control transformer 15 and tachometer 17. The ring demodulator 82 thus functions essentially as a full wave phase-sensitive detector.

The signal from the ring demodulator 82 develops a voltage across the resistor 136, and this voltage is applied through the resistor 141 to the grid 138 of tube 137. The signal applied to the grid 138 is applied simultaneously through the resistor 159 to the grid 156 of tube 155 and through the resistor 185 to the grid 182 of tube 181. The tube 137 is biased initially to cut off by the potentiometer 142 which provides a positive voltage to the cathode 139 with respect to the grid 138. Since the tube 137 is initially cut off, for a negative signal from the ring demodulator 82, it remains cut off. For a positive going signal, however, the tube is caused to conduct and a current from the plate 140 flows through the D.C. winding 143 of the saturable reactor 144. Current flowing through the D.C. winding 143 of the saturable reactor 144 changes the impedance of the A.C. windings 145.

The phase shift network 86 has a 60-cycle A.C. voltage applied across one diagonal of the bridge network 146. The A.C. voltage is obtained from the 115 volt A.C. line and is attenuated by means of the rheostat 148. Any variation in the A.C. impedance of windings 145 produces a change in phase across the other diagonal of the bridge network 146, and this phase shifted voltage is applied to the primary winding 149 of the transformer 150. The voltage developed across the secondary winding 153 of the transformer 150 is applied to the grids 214 and 220 of the thyratrons 210 and 211, respectively.

The thyratrons 210 and 211 are connected in inverse parallel and an A.C. line voltage is applied to the plates 217 and 224, respectively. These tubes are caused to conduct during alternate half cycles when the positive voltage on the respective plates exceeds the ionization potential of the gas within the tubes. The time at which each of the tubes 210 or 211 begins to conduct during each half cycle is controlled by the amount of phase shift of the voltage on the grids 214 and 220 with respect to the plates 217 and 224, respectively. A negative grid bias voltage for the grids 214 and 220 is obtained from the —E terminal of the power supply 92. The diode tubes 212 and 213 function alternately to drop the voltage on the cathodes 216 and 223, respectively, to ground potential during the half of each A.C. cycle, when the respective cathode goes negative. The plates 228 and 231 are at ground potential, and the tubes 212 and 213 begin to conduct whenever the potential on the cathodes 227 and 230, respectively, is less than ground potential.

The current flowing through the thyratrons 210 and 211 also flows through the windings 63 and 64 and the phase shift capacitor 65 of the motor 16. The rotor 62 is caused to rotate in the forward direction because of the direction of flow of current through the windings 63 and 64, and the torque exerted by the rotor is determined by the magnitude of the current.

The voltage developed across the phase shift capacitor 65 also appears across the thyratron tubes 240 and 241 and could produce misfiring thereof unless provision was made to prevent these tubes from conducting. Such misfiring is prevented by means of the D.C. blocking amplifiers 90 and 91, as will be described hereinafter.

The positive signal applied to the grid 138 of tube 137 and to the grid 156 of tube 155 causes the tube 155 to conduct and produce a drop in the voltage on the plate 158. This negative going voltage is applied through the resistors 162 and 167 to the grid 164 of tube 163. The tube 163 is cut off initially and this negative going signal causes the tube 163 to remain cut off and no control signal is applied to the reverse thyratrons 89.

The positive voltage applied to the grid 182 of tube 181 increases the tube current and produces a drop in the voltage on the plate 184. This negative going voltage is applied through the resistor 189, the potentiometer 190, and the resistor 192 to the grids 245 and 251 of the thyratron tubes 240 and 241, respectively. This negative voltage applied to the grids 245 and 251 prevents these tubes from conducting, notwithstanding a positive voltage appearing on the plates 247 and 253, respectively, by virtue of a voltage across the phase shift capacitor 65. The tubes 240 and 241 are thus prevented from conducting when no control signal is supplied from the D.C. amplifier 85.

When a voltage of negative polarity is supplied from the ring demodulator 82, this voltage also is applied to the grids 138, 156, and 182 of the tubes 137, 155, and 181, respectively. The negative voltage applied to the grid 138 causes the tube 137 to remain cut off; therefore, no control signal is supplied through the phase shift network 86 to the forward thyratrons 88.

The tube 155 is normally conducting and the negative signal applied to the grid 156 reduces the plate current flow and produces an increase in the voltage on the plate 158. This positive going voltage is applied through the resistor 162 and resistor 167 to the grid 164 of tube 163. The tube 163 is caused to conduct and current from the plate 166 flows through the D.C. winding 169 of the saturable reactor 170. The current flowing through the D.C. winding 169 produces a change in the impedance of the A.C. windings 171. A change in the A.C. impedance of windings 171 produces a phase shift in the voltage across one diagonal of the bridge network 172, and this phase shifted voltage is applied through the transformer 176 to the grids 244 and 250 of the thyratron tubes 240 and 241 respectively. The tubes 240 and 241 also are connected in inverse parallel and are caused to conduct during alternate half cycles by virtue of the A.C. voltage appearing on the plates 247 and 253 respectively. The duration of conduction during each half cycle is determined by the amount of phase shift in the voltage on the grids 244 and 250. The diodes 242 and 243 function to drop the voltage on the cathodes 246 and 252, respectively, to ground potential during the half of each A.C. cycle when the respective cathode goes negative.

Current flowing through the thyratrons 240 and 241, also flows through the windings 63 and 64, causing the rotor 62 to rotate in the reverse direction. The torque exerted by the rotor 62 is determined by the magnitude of the current flowing from the thyratrons 240 and 241.

A voltage also appears across the phase shift capacitor 65, which is applied to the plates 217 and 224 of the forward thyratrons 210 and 211, respectively. These tubes are prevented from conducting, however, by reason of a negative voltage appearing on the grids 215 and 221, respectively. This negative voltage is obtained from the plate 197 of the D.C. blocking amplifier 91, as will now be described.

The negative voltage initially applied to the grid 182 of tube 181 is inverted in phase by the tube 181 and is applied through the resistor 189, potentiometer 190, and resistor 198 to the grid 195 of tube 194. The positive voltage applied to the grid 195 causes a drop in the voltage on the plate 197 and this negative going voltage is applied through the resistor 202, potentiometer 203, and resistor 206 to the grids 215 and 221 of the forward thyratron tubes 210 and 211, respectively. Misfiring of the forward thyratrons 88 is thus prevented when a control signal is supplied to the reverse thyratrons 89.

There has thus been provided by this invention an improved thyratron control circuit for a two-phase motor wherein the thyratron tubes conduct only when a control signal is applied thereto and means have been provided to prevent misfiring of some of the thyratron tubes when no control signal is applied thereto while other thyratron tubes are conducting.

The thyratron control circuit of the present invention can be utilized to drive two or more electric motors when desired. In particular, the motors 13 and 16 can be driven simultaneously by the servo amplifier 18. The motors 13 and 16 for this purpose can be connected either in series or in parallel. The series connection of the two motors 13 and 16 has the advantage of lower current demand from the thyratrons, particularly where the two motors are of different rated current capacities. The current supplied by the thyratrons for such a series connection is determined by the larger of the current ratings of the two motors. The lower current demand for series connection introduces the possibility of using thyratrons having a lower current carrying capacity, provided the peak inverse voltage is not exceeded. Another advantage of the series connection is the fact that the back E.M.F.'s generated by the two motors are series opposing and therefore reduce over-all system damping.

The parallel connection of the motors 13 and 16 to a common servo amplifier 18 allows the use of A.C. motors of different winding impedances to be controlled simultaneously.

Although the improved control circuit of the present invention has been shown utilizing thyratron tubes for driving a two-phase motor, it is contemplated that the thyratrons can be replaced by magnetic amplifiers or other controllable current carrying devices without departing from the spirit of the invention.

I wish it to be understood that my invention is not to be limited to the specific constructions and arrangements shown and described, except only insofar as the appended claims may be so limited, as it will be understood by those skilled in the art that changes may be made without departing from the principles of the invention.

I claim:

1. In a control system for an electric motor, the combination of means for causing the motor to rotate in a forward direction included in electron tube with first and second control grids, means for causing the motor to rotate in the reverse direction including another electron tube with first and second control grids, a control circuit connected to said first grids of each of said electron tubes for controlling the conduction thereof, and blocking means connected to each of said second grids for preventing the conduction of one of said tubes when the other of said tubes is caused to conduct by said control means.

2. In a thyratron control circuit for a two phase motor, the combination of a first set of thyratrons operatively connected for causing the motor to rotate in a forward direction, a second set of thyratrons operatively connected for causing the motor to rotate in a reverse direction, a source of alternating voltage for energizing the motor and said thyratrons, first control means effective to trigger said first set of thyratrons into conduction, second control means effective to trigger said second set of thyratrons into conduction, first direct current blocking means connected to one set of said thyratrons for preventing the misfiring thereof when the other set of thyratrons is conducting, and second direct current blocking means connected to said first direct current blocking means and to the other of said sets of thyratrons for preventing the misfiring thereof when the other of said sets of thyratrons is conducting.

3. In a control system for a two phase electric motor having two windings, the combination of a first pair of thyratrons connected in inverse parallel and adapted to drive the motor in a forward direction; a second pair of thyratrons connected in inverse parallel and adapted to drive the motor in a reverse direction; a source of alternating voltage for energizing the windings of the motor and said thyratrons; control means for controlling the conduction of each of said pairs of thyratrons; a first direct current blocking amplifier operatively connected for preventing the misfiring of one of said pairs of thyratrons; and a second direct current blocking amplifier operatively connected for preventing the misfiring of the other of said pairs of thyratrons, each one of said thyratrons having a first and a second control grid with said control means being connected to each of said first control grids and one of said blocking amplifiers being connected to each of said second control grids.

References Cited in the file of this patent
UNITED STATES PATENTS
2,480,125      Field _____ Aug. 30, 1949